United States Patent
Zong et al.

(10) Patent No.: US 11,397,127 B2
(45) Date of Patent: Jul. 26, 2022

(54) METHOD OF ICE DISTRIBUTION AND DATA PROCESSING FOR SHIP ICE RESISTANCE EXPERIMENT IN BROKEN ICE FIELD

(71) Applicant: DALIAN UNIVERSITY OF TECHNOLOGY, Liaoning (CN)

(72) Inventors: Zhi Zong, Liaoning (CN); Zhihong Yin, Liaoning (CN); Guiyong Zhang, Liaoning (CN); Zhe Sun, Liaoning (CN); Hao Wang, Liaoning (CN); Biye Yang, Liaoning (CN); Yuyan Jiang, Liaoning (CN); Zhaoyang Chen, Liaoning (CN); Tao Yang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 210 days.

(21) Appl. No.: 16/957,804

(22) PCT Filed: Aug. 9, 2019

(86) PCT No.: PCT/CN2019/099883
§ 371 (c)(1),
(2) Date: Jun. 25, 2020

(87) PCT Pub. No.: WO2020/140434
PCT Pub. Date: Jul. 9, 2020

(65) Prior Publication Data
US 2021/0172831 A1    Jun. 10, 2021

(30) Foreign Application Priority Data
Jan. 5, 2019    (CN) .......................... 201910009611.5

(51) Int. Cl.
G01M 10/00    (2006.01)

(52) U.S. Cl.
CPC .................................. *G01M 10/00* (2013.01)

(58) Field of Classification Search
CPC ....................................................... G01M 10/00
See application file for complete search history.

(56) References Cited

FOREIGN PATENT DOCUMENTS

| CN | 107014587 A | 8/2017 |
|----|-------------|--------|
| CN | 107021184 A | 8/2017 |

(Continued)

OTHER PUBLICATIONS

Yulmetov, Renat "Observations and Numerical Simulation of Icebergs in Broken Ice" Doctoral theses at NTNU, 2017. (Year: 2017).*

(Continued)

*Primary Examiner* — Paul M. West
(74) *Attorney, Agent, or Firm* — Novick, Kim & Lee, PLLC; Allen Xue

(57) ABSTRACT

In a method of ice distribution and data processing for ship ice resistance experiment in broken ice field, the ice floe is uniformly distributed in the broken ice field before each ship ice resistance experiment with eliminating the mutually overlapped broken ice to make it close to the experimental design working condition, and independent repeated experiments are carried out on each ship ice resistance experiment to reduce the influence of accidental factors; after finishing the experiment, the experimental data are divided into intervals and the experimental data corresponding to unreasonable subdomains are eliminated by mathematical statistics, and the uncertainty analysis is carried out; image correction is carried out for pictures of in broken ice field in the pre-experimental data, and the pictures are divided to obtain subdomain pictures to calculate the actual coverage (Continued)

rate of each subdomain; the ice resistance in the experimental data corresponding to each remaining subdomain is modified.

11 Claims, 2 Drawing Sheets

(56) References Cited

FOREIGN PATENT DOCUMENTS

| CN | 108195561 A | 6/2018 |
| CN | 109752165 A | 5/2019 |
| JP | 2018009793 A | 1/2018 |

OTHER PUBLICATIONS

Kim, Moon-Chan et al. "Numerical and experimental investigation of the resistance performance of an iceberg cargo vessel in pack ice conditions" Int. J. Naval Archit. Ocean Eng. (2013) 5:116-131. (Year: 2013).*

Zufelt, Jon E. et al. "Model Ice Properties" CRREL Report 96-1, Feb. 1996. (Year: 1996).*

Huang, Yan et al.; "Model Tests on the Resistance of a Large Transport Ship in Arctic Region with Pack Ice"; Shipbuilding Of China; Sep. 30, 2016; vol. 57 No. 3; ISSN: 1000-488, p. 26-35.

Quality Systems Group of the 28th ITTC;"Experimental Uncertainty Analysis for Ship Resistance in Ice Tank Testing"; Sep. 2005.

Shen, Zhaowei; "Non-freezing synthetic model ice and its engineering application"; China Master's Theses Full-text Database; Jun. 15, 2002, vol. 1; ISSN 1671-6779, CN 11-9246/G.

* cited by examiner

Uniformly distributing the ice floes in the broken ice field with eliminating the overlapped ice floes, recording the pre-experiment data; carrying out the ship ice resistance experiment in broken ice field, and recording the experimental data; repeating the above processes at least three times.

Based on the segmentation hypothesis and stable state requirement, dividing the broken ice field into multiple subdomains.

Conducting an outlier data point judgment for the experimental data corresponding to each subdomain to discard the experimental data corresponding to abnormal subdomains, and conducting uncertainty analysis of the experimental data corresponding to the remaining subdomains.

Conducting an image correction for the pictures of the broken ice field in the pre-experiment data and dividing the pictures by subdomains to obtain subdomain pictures, and calculating an actual coverage rate of subdomain corresponding to each subdomain picture.

According to the actual coverage rate of subdomain and design coverage rate of subdomains, modifying ice resistance in the experimental data corresponding to each remaining subdomain to obtain a final ice resistance corresponding to each remaining subdomain.

Fig. 1

METHOD OF ICE DISTRIBUTION AND DATA PROCESSING FOR SHIP ICE RESISTANCE EXPERIMENT IN BROKEN ICE FIELD

TECHNICAL FIELD

The present disclosure relates to a method of ice distribution and data processing for ship ice resistance experiment in broken ice field.

BACKGROUND ART

Due to global warming, navigation in the arctic is becoming a reality. Ice resistance in broken ice field is an important factor that must be considered in polar ship design. Therefore, it is of great value to carry out ship ice experiment in broken ice field. However, there is still a shortage of guidance methods for ship ice experiment in broken ice field, especially for the processing flow of broken ice field in the experiment.

SUMMARY OF THE INVENTION

According to the technical problems mentioned above, the present disclosure provides a method of ice distribution and data processing for ship ice resistance experiment in broken ice field. According to the ice distribution and data processing flow of ship ice resistance experiment in broken ice field, the present disclosure aims to solve the problem that the actual situation of broken ice field during the experiment differs from the design working condition, and to calculate the uncertainty of ice resistance measurement, which makes the broken ice experimental data more reliable and provides reference for other broken ice experiments and the similar experiments. The technical solutions of the present disclosure are as follows:

A method of ice distribution and data processing for ship ice resistance experiment in broken ice field, includes the following steps:

S1. uniformly distributing ice floes in a broken ice field with eliminating the mutually overlapped ice floes, recording the pre-experiment data;

carrying out a ship ice resistance experiment in the broken ice field, and recording the experimental data;

S2. repeating step S1 at least three times;

the ice floes in the ship ice resistance experiment are uniformly distributed, but in fact the distribution of ice floes in the broken ice field is different from the uniform distribution of design due to the water surface perturbance caused by various factors. The ship ice resistance experiment in broken ice field needs to repeat at least three times to reduce the impact of the perturbance. Before each ship ice resistance experiment in broken ice field, uniformly distribute the ice floes in the broken ice field with eliminating the mutually overlapped ice floes, then start the ship ice resistance experiment as soon as possible to ensure the ice floes in a state of uniform distribution when the ship is conducting experiments in the broken ice field, which reduces the influence by the error between the actual distribution of ice floes and the design uniform distribution.

S3. based on the segmentation hypothesis and stable state requirement in ITTC ice testing guidance document (Ice Testing Experimental Uncertainty Analysis for Ship Resistance in Ice Tank Testing), dividing the broken ice field into multiple subdomains;

S4. conducting an outlier data point judgment for the experimental data corresponding to each subdomain to discard the experimental data corresponding to the abnormal subdomains, and conducting uncertainty analysis of the experimental data corresponding to the remaining subdomains;

S5. conducting an image correction for pictures of the broken ice field in the pre-experiment data and dividing the pictures by subdomains to obtain subdomain pictures, and calculating an actual coverage rate of each subdomain corresponding to each subdomain picture;

S6. according to the actual coverage rate and the design coverage rate of each subdomain, modifying the ice resistance in the experimental data corresponding to each remaining subdomain to obtain a final ice resistance corresponding to each remaining subdomain.

During the ship ice resistance experiment in broken ice field, the ship passes through the broken ice field at a constant speed, and the ice floes are polyethylene plates with uniform thickness.

The principle of dividing the broken ice field into multiple subdomains in step S3 is as follows:

the length of the subdomain is 1.5-2.5 times the length of the ship;

the ship has at least 10 collisions with the ice floes in the subdomain;

the experimental data corresponding to the subdomains should be able to indicate a general variation trend (time-history curve); if the subdomain trend is not reasonable and repeatable, the segmentation of the subdomain cannot be regarded as an independent experiment.

The number of the subdomains in step S3 is 10-15.

The detailed steps of step S4 are as follows:

due to the accidental events in the actual experimental situation, not every subdomain is reasonable; therefore, it is necessary to judge the outlier data point of each subdomain to conduct screening;

one kind of data from the experimental data corresponding to each subdomain was selected and judged according to formula (1);

$$(Chauv\#)_{Mean} = \left| \frac{F_{T\_mean} - (Mean\_F_{T\_mean})}{(STD\_F_{T\_mean})} \right| \quad (1)$$

wherein, $(Chauv\#)_{Mean}$ represents Chauvenet value of the kind of data, $F_{T\_mean}$ represents a mean value of the selected data of each subdomain, $Mean\_F_{T\_mean}$ represents a mean value of the mean values of the selected data of all subdomains, $STD\_F_{T\_mean}$ represents a variance of the mean values of the selected data of all subdomains;

if the value of $(Chauv\#)_{Mean}$ of the subdomain is not within the range of 1.96-2.13, the subdomain is abnormal and discard the corresponding experimental data, then conduct uncertainty analysis of the experimental data corresponding to the remaining subdomains:

$$U(F_{T\_mean}) = \frac{t*(STD\_F_{T\_mean})}{\sqrt{N}} \quad (2)$$

wherein, $U(F_{T\_mean})$ represents a uncertainty of one kind of data in the experimental data corresponding to the remaining subdomaina, t represents an empirical coefficient, $(STD\_F_{T\_mean})$ represents a variance of the mean values of the same kind of data in the experimental data corresponding to all the remaining subdomains, N represents a number of the remaining subdomains;

$U_p(F_{T\_mean})$ was expressed as the following form of percentage:

$$U_p(F_{T\_mean}) = \frac{U(F_{T\_mean})}{\text{Mean\_}F_{T\_mean}} * 100 \quad (3)$$

wherein, $\text{Mean\_}F_{T\_mean}$ represents a mean value of a certain kind data in the experimental data corresponding to all the remaining subdomains.

The detailed steps of step S5 are as follows: because of it is difficult to cover the whole long narrow broken ice field in the pictures of the pre-experimental data and there are many influence factors such as perspective deformation, the coverage rate cannot be calculated directly.

the pictures of broken ice field in the pre-experimental data are carried out geometric correction by using MATLAB to eliminate perspective deformation, and divided by subdomain to obtain subdomain pictures, so as to make it close to the real broken ice field situation;

calculate the actual coverage rate of each subdomain picture: in the experiment, because the actual coverage rate of a subdomain is always different from the design coverage rate and the ice floes in the subdomain picture is brighter and the water area background in the subdomain picture is darker, the subdomain picture is carried out binarization processing by using MATLAB for the subdomain pictures, and the threshold value is adjust as high as possible (0-255), so as to remove the influence of other brighter factors in the subdomain picture as far as possible;

calculate the actual coverage rate of the subdomain picture after binarization processing: actual coverage rate equals the number of white pixels in the subdomain picture after binarization processing divided by the total number of pixels in the subdomain picture after binarization processing;

the obtained actual coverage rate is equal to the actual coverage rate of the subdomain corresponding to the picture of the subdomain;

wherein, the number of white pixels in the picture after binarization processing can be used to represent the area of broken ice, and divided by the total number of pixels in the picture after binarization processing to obtain the actual coverage rate.

In step S6, a final ice resistance corresponding to each remaining subdomain is obtained by the following formula:

$$F_{ice\_final} = F_{ice\_test} \frac{\text{coverage\_design}}{\text{coverage\_modified}} \quad (4)$$

wherein, $F_{ice\_final}$ represents the final ice resistance corresponding to each remaining subdomain, $F_{ice\_test}$ represents an ice resistance in the experimental data corresponding to each remaining subdomain, coverage_design represents a design coverage rate of the subdomain, coverage_modified represents an actual coverage rate of the subdomain.

Compared with the prior art, the ice floes in the present disclosure is uniformly distributed in the broken ice field before each ship ice resistance experiment in broken ice field, and the overlapped ice floes are eliminated to make it close to the experimental design working condition, and independent repeated experiments are carried out on each ship ice resistance experiment in broken ice field to reduce the influence of accidental factors; after finishing the experiment, the experimental data are divided into intervals, then the experimental data corresponding to unreasonable subdomains are eliminated by mathematical statistics and the uncertainty analysis is carried out; image correction is carried out for pictures of broken ice field in the pre-experimental data and the pictures are divided into subdomains to obtain subdomain pictures, then the actual coverage rates of subdomains are calculated; the ice resistance in the experimental data corresponding to each remaining subdomain is modified, so as to make the experimental data more reliable.

BRIEF DESCRIPTION OF THE DRAWINGS

In order to illustrate more clearly the technical solutions in the embodiments of the present disclosure or in the prior art, a brief description is given hereinafter to the accompany drawings that may be used in the embodiments or the prior art, the drawings described below are some embodiments of the present disclosure, for the ordinary person skilled in the art, other drawings can be obtained according to these drawings without paying any creative labor.

FIG. 1 is a flow diagram of the method of ice distribution and data processing for ship ice resistance experiment in broken ice field in the embodiments of the present disclosure.

DETAILED DESCRIPTION OF THE PREFERRED EMBODIMENTS

Figure 2:
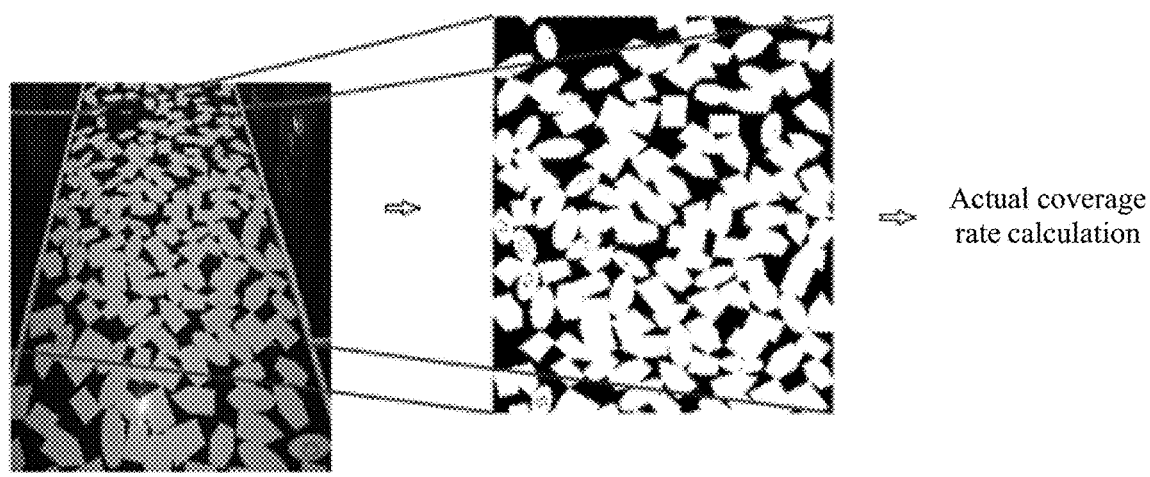
FIG. 2 is a flow diagram of image correction, subdomain division, binarization processing and actual coverage rate calculation of broken ice field pictures in the pre-experiment data in the embodiment of the present disclosure.

In order to make the purpose, technical solutions and advantages of the present disclosure clearer, a clear and complete description of the embodiments in the present disclosure is given herein after in combination with the accompany drawings of the embodiment, the embodiments described below are part embodiments of the present disclosure and not all of them. Based on the embodiments in the present disclosure, all other embodiments obtained by ordinary person skilled in the art without paying any creative labor belong to the protection scope of the present disclosure.

As shown in FIG. 1 and FIG. 2, a method of ice distribution and data processing method for ship ice resistance experiment in broken ice field, includes the following steps:

S1. the ice floes were uniformly distribute in the broken ice field and the overlapped ice floes was eliminate, then recorded the pre-experiment data;

the ship ice resistance experiment was carried out in the broken ice field, and the experimental data was recorded;

S2. step S1 was repeated at least three times;

S3. based on the segmentation hypothesis and stable state requirement in ITTC ice testing guidance document (ICE Testing Experimental Uncertainty Analysis for Ship Resistance in Ice Tank Testing), the broken ice field was divided into multiple subdomains;

S4. an outlier data point judgment was conducted for the experimental data corresponding to each subdomain to discard the experimental data corresponding to the abnormal subdomain, and uncertainty analysis was conducted for the experimental data corresponding to the remaining subdomains;

S5. an image correction was conducted for the pictures of the broken ice field in the pre-experiment data and the pictures were divided by subdomains to obtain subdomain pictures, then the actual coverage rate of the subdomain corresponding to each subdomain picture was calculated;

S6. according to the actual coverage rate and the design coverage rate of the subdomain, the ice resistance in the experimental data corresponding to each remaining subdomain was modified to obtain the final ice resistance in broken ice field corresponding to each remaining subdomain.

During the ship ice resistance experiment in broken ice field, the ship passed through the broken ice field at a constant speed, and the ice floes were polyethylene plates with uniform thickness.

The principle of dividing the broken ice field into multiple subdomains in step S3 is as follows:
a length of the subdomain is 1.5-2.5 times a length of the ship;
the ship has at least 10 collisions with the ice floes in the subdomain;
the experimental data corresponding to the subdomain should be able to indicate a general variation trend.

The number of the subdomains in step S3 was 10-15.

The specific steps of step S4 was as follows:
one kind of data was selected from the experimental data corresponding to each subdomain and judged according to formula (1); the data selected in this embodiment was the towing force;

$$(Chauv\#)_{Mean} = \left| \frac{F_{T\_mean} - (Mean\_F_{T\_mean})}{(STD\_F_{T\_mean})} \right| \quad (1)$$

wherein, $(Chauv\#)_{Mean}$ was the Chauvenet value of the mean towing force, $F_{T\_mean}$ was the mean value of the towing force of each subdomain, $Mean\_F_{T\_mean}$ was the mean value of the mean values (i.e., $F_{T\_mean}$) of the towing forces of all subdomains, $STD\_F_{T\_mean}$ was the variance of the mean values (i.e., $F_{T\_mean}$) of the towing forces of all subdomains;

if the value of $(Chauv\#)_{Mean}$ of the subdomain is not within the range of 1.96-2.13, the subdomain is abnormal and the corresponding experimental data is discarded, then an uncertainy analysis of the experimental data corresponding to the remaining subdomain is conducted:

$$U(F_{T\_mean}) = \frac{t * (STD\_F_{T\_mean})}{\sqrt{N}} \quad (2)$$

wherein, $U(F_{T\_mean})$ was the uncertainty of the towing force in the experimental data corresponding to the remaining subdomains, t was the empirical coefficient, in this embodiment, t=2, $(STD\_F_{T\_mean})$ was the variance of the mean values of the towing forces in the experimental data corresponding to all the remaining subdomains, N was the number of the remaining subdomains;

$U_p(F_{T\_mean})$ was expressed as the following form of percentage;

$$U_p(F_{T\_mean}) = \frac{U(F_{T\_mean})}{Mean\_F_{T\_mean}} * 100 \quad (3)$$

wherein, $Mean\_F_{T\_mean}$ was the mean value of the mean values of the towing forces in the experimental data corresponding to all the remaining subdomains.

The detailed steps of step S5 are as follows:
geometric correction was carried out by using MATLAB on the broken ice field pictures in the pre-experimental data to eliminate the perspective deformation, and the pictures were divided by subdomain to obtain subdomain pictures;
the actual coverage rate of each subdomain picture was calculated:
picture binarization processing was carried out by using MATLAB for the subdomain pictures, and the threshold value was adjusted as high as possible;
the actual coverage rate of the picture after binarization processing was calculated: the actual coverage rate=the number of white pixels in the picture after binarization processing divided by the total number of pixels in the picture after binarization processing; the actual coverage rate obtained was equal to the actual coverage rate of the subdomain corresponding to the picture of the subdomain.

In step S6, the final ice resistance corresponding to each remaining subdomain is obtained by the following formula:

$$F_{ice\_final} = F_{ice\_test} \frac{coverage\_design}{coverage\_modified} \quad (4)$$

wherein, $F_{ice\_final}$ was the final ice resistance corresponding to each remaining subdomain, $F_{ice\_test}$ was the ice resistance in the experimental data corresponding to each remaining subdomain, coverage_design was the design coverage rate of the subdomain, coverage_modified was the actual coverage rate of the subdomain.

Finally, it should be noted that the above embodiments are only used to illustrate the technical solutions of the present disclosure without limiting; although the present disclosure is described in detail with reference to the foregoing embodiments, the ordinary skilled in the art shall understand that they may still make amendments to the technical solutions disclosed in the foregoing embodiments, or make equal replacements for some or all of their technical characteristics; these amendments or replacements do not remove the essence of the corresponding technical solutions from the scope of the technical solutions of each embodiment of the present disclosure.

The invention claimed is:
1. A method of ice distribution and data processing for ship ice resistance experiment in broken ice field, comprising the following steps:
S1. uniformly distributing ice floes in a broken ice field, eliminating overlapped ice floes, and recording pre-experiment data;
carrying out a ship ice resistance experiment by passing a ship through the broken ice field, and recording experimental data;
S2. repeating step S1 at least three times;
S3. dividing the broken ice field into a plurality of subdomains;
S4. conducting an outlier data point judgment for the experimental data corresponding to each subdomain, discarding experimental data corresponding to abnor- mal subdomains among the plurality of subdomains, and conducting uncertainty analysis for the experimental data corresponding to remaining subdomains among the plurality of subdomains;

S5. performing a geometric correction on pictures of the broken ice field in the pre-experimental data to eliminate perspective deformation;

assigning at least one subdomain picture to each of the plurality of subdomains;

performing image binarization processing to the at least one subdomain picture for each subdomain;

calculating an actual coverage rate for each subdomain picture after binarization processing, wherein the actual coverage rate equals a number of white pixels in the picture after binarization processing divided by a total number of pixels in the picture after binarization processing;

and

S6. according to the actual coverage rate and a design coverage rate of each subdomain, modifying ice resistance in the experimental data corresponding to each remaining subdomain to obtain a final ice resistance corresponding to each remaining subdomain.

2. The method according to claim 1, wherein the ship passes through the broken ice field at a constant speed during the ship ice resistance experiment in the broken ice field, and the ice floes are polyethylene plates with a uniform thickness.

3. The method according to claim 1, wherein, in step S3:
a length of each subdomain is 1.5-2.5 times a length of the ship; and
the ship has at least 10 collisions with the ice floes in each subdomain.

4. The method according to claim 3, wherein a number of the plurality of subdomains in step S3 is 10-15.

5. The method according to claim 4, wherein step S4 comprises:

selecting one kind of data from the experimental data corresponding to each subdomain, and judging the data according to equation (1), $$(Chauv\#)_{Mean} = \left| \frac{F_{T\_mean} - (Mean\_F_{T\_mean})}{(STD\_F_{T\_mean})} \right|, \quad (1)$$

wherein, $(Chauv\#)_{Mean}$ represents a Chauvenet value of the kind of data, $F_{T\_mean}$ represents a mean value of the selected data of each subdomain, $Mean\_F_{T\_mean}$ represents a mean value of the mean values of the selected data of all subdomains, $STD\_F_{T\_mean}$ represents a variance of the mean values of the selected data of all subdomains;

when the value of $(Chauv\#)_{Mean}$ of the subdomain is not within the range of 1.96-2.13, determining the subdomain as abnormal and discarding the corresponding experimental data, and conducting uncertainty analysis of the experimental data corresponding to the remaining subdomains according to equation (2):

$$U(F_{T\_mean}) = \frac{t*(STD\_F_{T\_mean})}{\sqrt{N}}, \quad (2)$$

wherein, $U(F_{T\_mean})$ represents an uncertainty of one kind of data in the experimental data corresponding to the remaining subdomains, t represents an empirical coefficient, $(STD\_F_{T\_mean})$ represents a variance of the mean values of one kind of data in the experimental data corresponding to all the remaining subdomains, and N represents a number of the remaining subdomains; and expressing $U(F_{T\_mean})$ as a percentage value according to equation (3):

$$U_p(F_{T\_mean}) = \frac{U(F_{T\_mean})}{Mean\_F_{T\_mean}} *100, \quad (3)$$

wherein $Mean\_F_{T\_mean}$ represents the mean value of one kind of data in the experimental data corresponding to all the remaining subdomains.

6. A method of ice distribution and data processing for ship ice resistance experiment in broken ice field, comprising:

S1. uniformly distributing ice floes in a broken ice field, eliminating overlapped ice floes, and recording pre-experiment data;

carrying out a ship ice resistance experiment by passing a ship through the broken ice field, and recording experimental data;

S2. repeating step S1 at least three times;

S3. dividing the broken ice field into a plurality of subdomains;

S4. conducting an outlier data point judgment for the experimental data corresponding to each subdomain, discarding experimental data corresponding to abnormal subdomains among the plurality of subdomains, and conducting uncertainty analysis for the experimental data corresponding to remaining subdomains among the plurality of subdomains;

S5. conducting an image correction for pictures of the broken ice field in the pre-experiment data and assigned one or more pictures to each of the plurality of subdomains, and calculating an actual coverage rate of each subdomain corresponding to the one or more pictures assigned thereto;

and

S6. according to the actual coverage rate and a design coverage rate of each subdomain, modifying ice resistance in the experimental data corresponding to each remaining subdomain to obtain a final ice resistance corresponding to each remaining subdomain, wherein the final ice resistance corresponding to each remaining subdomain is obtained according to equation (4):

$$F_{ice\_final} = F_{ice\_test} \frac{coverage\_design}{coverage\_modified}. \quad (4)$$

wherein, $F_{ice\_final}$ represents the final ice resistance corresponding to each remaining subdomain, $F_{ice\_test}$ represents an ice resistance in the experimental data corresponding to each remaining subdomain, coverage_design represents the design coverage rate of the subdomain, coverage_modified represents the actual coverage rate of the subdomain.

7. The method according to claim 6, wherein the ship passes through the broken ice field at a constant speed during the ship ice resistance experiment in the broken ice field, and the ice floes are polyethylene plates with a uniform thickness.

8. The method according to claim 6, wherein, in step S3, a length of each subdomain is 1.5-2.5 times a length of the ship; and the ship has at least 10 collisions with the ice floes in each subdomain.

9. The method according to claim 8, wherein a number of the plurality of subdomains in step S3 is 10-15.

10. The method according to claim 6, wherein step S4 comprises:

selecting one kind of data from the experimental data corresponding to each subdomain, and judging the data according to equation (1), $$(Chauv\#)_{Mean} = \left| \frac{F_{T\_mean} - (Mean\_F_{T\_mean})}{(STD\_F_{T\_mean})} \right|, \quad (1)$$

wherein, $(Chauv\#)_{Mean}$ represents a Chauvenet value of the kind of data, $F_{T\_mean}$ represents a mean value of the selected data of each subdomain, $Mean\_F_{T\_mean}$ represents a mean value of the mean values of the selected data of all subdomains, $STD\_F_{T\_mean}$ represents a variance of the mean values of the selected data of all subdomains;

when the value of $(Chauv\#)_{Mean}$ of the subdomain is not within the range of 1.96-2.13, determining the subdomain as abnormal and discarding the corresponding experimental data, and conducting uncertainty analysis of the experimental data corresponding to the remaining subdomains according to equation (2):

$$U(F_{T\_mean}) = \frac{t*(STD\_F_{T\_mean})}{\sqrt{N}}, \quad (2)$$

wherein, $U(F_{T\_mean})$ represents an uncertainty of one kind of data in the experimental data corresponding to the remaining subdomains, t represents an empirical coefficient, $(STD\_F_{T\_mean})$ represents a variance of the mean values of one kind of data in the experimental data corresponding to all the remaining subdomains, and N represents a number of the remaining subdomains; and expressing $U(F_{T\_mean})$ as a percentage value according to equation (3):

$$U_p(F_{T\_mean}) = \frac{U(F_{T\_mean})}{Mean\_F_{T\_mean}} *100, \quad (3)$$

wherein $Mean\_F_{T\_mean}$ represents the mean value of one kind of data in the experimental data corresponding to all the remaining subdomains.

11. The method according to claim 6, wherein step S5 comprises:

performing a geometric correction on pictures of the broken ice field in the pre-experimental data to eliminate perspective deformation;

assigning at least one subdomain picture to each of the plurality of subdomains;

performing image binarization processing to the at least one subdomain picture for each subdomain; and calculating an actual coverage rate for each subdomain picture after binarization processing, wherein the actual coverage rate equals a number of white pixels in the picture after binarization processing divided by a total number of pixels in the picture after binarization processing.

* * * * *